United States Patent
Ishibashi (10) Patent No.: US 9,432,441 B2
(45) Date of Patent: Aug. 30, 2016

(54) RELAYING DEVICE, IMAGE PROCESSING DEVICE, AND SYSTEM COMPRISING IMAGE PROCESSING DEVICE AND RELAYING DEVICE

(71) Applicant: Masayuki Ishibashi, Nagoya (JP)

(72) Inventor: Masayuki Ishibashi, Nagoya (JP)

(73) Assignee: BROTHER KOGYO KABUSHIKI KAISHA, Nagoya, Aichi (JP)

( * ) Notice: Subject to any disclaimer, the term of this patent is extended or adjusted under 35 U.S.C. 154(b) by 228 days.

(21) Appl. No.: 14/170,114

(22) Filed: Jan. 31, 2014

(65) Prior Publication Data

US 2014/0258470 A1    Sep. 11, 2014

(30) Foreign Application Priority Data

Mar. 8, 2013    (JP) .................................. 2013-046467

(51) Int. Cl.
| | |
|---|---|
| G06F 15/16 | (2006.01) |
| H04L 29/08 | (2006.01) |
| H04N 1/00 | (2006.01) |
| H04N 1/32 | (2006.01) |
| H04N 1/333 | (2006.01) |

(52) U.S. Cl.
CPC .......... *H04L 67/06* (2013.01); *H04N 1/00244* (2013.01); *H04N 1/32406* (2013.01); *H04N 1/33307* (2013.01); *H04N 2201/0062* (2013.01); *H04N 2201/0068* (2013.01); *H04N 2201/0094* (2013.01); *H04N 2201/33378* (2013.01)

(58) Field of Classification Search
None
See application file for complete search history.

(56) References Cited

U.S. PATENT DOCUMENTS

| | | | |
|---|---|---|---|
| 6,625,646 B1 * | 9/2003 | Kamanaka | H04L 12/5835 709/224 |
| 7,484,211 B2 | 1/2009 | Nakaoka et al. | |
| 7,765,329 B2 * | 7/2010 | Cruciani | H04L 67/1097 370/395.5 |
| 2004/0201860 A1 | 10/2004 | Nakaoka et al. | |

(Continued)

FOREIGN PATENT DOCUMENTS

| | | |
|---|---|---|
| CN | 1516830 A | 7/2004 |
| CN | 1728761 A | 2/2006 |

(Continued)

OTHER PUBLICATIONS

Notice of Allowance dated Jan. 20, 2015 in related U.S. Appl. No. 14/170,171.

(Continued)

*Primary Examiner* — Brian P Whipple
(74) *Attorney, Agent, or Firm* — Scully, Scott, Murphy & Presser, P.C.

(57) ABSTRACT

A relaying device may be configured to communicate with an image processing device and a server device via a network. The server device may be configured to store uploaded data. The relaying device may receive, from the image processing device, selected data format instruction information. The relaying device may execute a conversion processing when the upload data is data in a first format and the data format identified by the selected data format instruction information is a second format, or when the upload data is data in a third format and the data format identified by the selected data format instruction information is not the third format. The relaying device may receive the upload data and convert the received upload data into converted data in the data format identified by the selected data format instruction information. The relaying device may transmit the converted data to the server device.

12 Claims, 8 Drawing Sheets

(56) References Cited

U.S. PATENT DOCUMENTS

| | | |
|---|---|---|
| 2005/0094178 A1* | 5/2005 | Anno ................ H04N 1/00244 358/1.13 |
| 2005/0280857 A1 | 12/2005 | Sugiyama et al. |
| 2010/0205279 A1* | 8/2010 | Takakura ................ H04L 67/16 709/219 |
| 2011/0090535 A1 | 4/2011 | Towata |
| 2011/0149333 A1 | 6/2011 | Hong |
| 2012/0033257 A1 | 2/2012 | Okazawa |
| 2012/0036570 A1 | 2/2012 | Wada |
| 2012/0057193 A1 | 3/2012 | Jazayeri et al. |
| 2012/0229845 A1 | 9/2012 | Maekawa et al. |
| 2012/0327467 A1 | 12/2012 | Sugiyama et al. |
| 2013/0208302 A1* | 8/2013 | Tanaka ............... H04N 1/00228 358/1.15 |
| 2014/0002836 A1 | 1/2014 | Ishino et al. |
| 2014/0247459 A1 | 9/2014 | Maekawa et al. |
| 2014/0293308 A1 | 10/2014 | Ishibashi |

FOREIGN PATENT DOCUMENTS

| | | |
|---|---|---|
| CN | 102681801 A | 9/2012 |
| EP | 2 498 177 A2 | 9/2012 |
| JP | 2005-269250 A | 9/2005 |
| JP | 2008-229993 A | 10/2008 |
| WO | 2011/080994 A1 | 7/2011 |
| WO | 2011/105013 A1 | 9/2011 |

OTHER PUBLICATIONS

Notice of Allowance dated Jan. 20, 2015 in related U.S. Appl. No. 14/169,931.
Extended European Search Report dated Feb. 19, 2015 from related European Application No. 14 15 3534.4.
Extended European Search Report dated Feb. 19, 2015 from related European Application No. 14 15 3535.1.
U.S. Appl. No. 14/170,171, filed Jan. 31, 2014, entitled "Relaying Device, Image Processing Device, and System Comprising Image Processing Device and Relaying Device", first named inventor: Masayuki Ishibashi.
U.S. Appl. No. 14/169,931, filed Jan. 31, 2014, entitled "Relaying Device, Image Processing Device, and System Comprising Image Processing Device and Relaying Device", first named inventor: Masayuki Ishibashi.
Chinese Notification of First Office Action dated Jun. 14, 2016 received in related application CN 201410044196.4 together with an English language translation.
Chinese Notification of First Office Action dated Jul. 7, 2016 received in related application CN 201410044195.X together with an English language translation.

* cited by examiner

FIG. 10

RELAYING DEVICE, IMAGE PROCESSING DEVICE, AND SYSTEM COMPRISING IMAGE PROCESSING DEVICE AND RELAYING DEVICE

CROSS-REFERENCE TO RELATED APPLICATION(S)

This application claims priority to Japanese Patent Application No. 2013-046467, filed on Mar. 8, 2013, the contents of which are hereby incorporated by reference into the present application.

TECHNICAL FIELD

The present specification discloses a relaying device connected with an image processing device and a server via a network.

DESCRIPTION OF RELATED ART

In recent years, an electronic file storing service capable of storing an electronic file in a storage server on a network has been widespread.

SUMMARY

A desired electronic file may be uploaded from an image processing device to an electronic file storing service. However, when data formats which can be interpreted by the image processing device are limited, there are cases in which the electronic file in a data format which cannot be interpreted by the image processing device cannot be uploaded from the image processing device to the electronic file storing service.

In one aspect of the teachings disclosed herein, a relaying device may be provided. The relaying device may comprise, a network interface, a processor, and a memory storing instructions. The instructions, when executed by the processor, may cause the relaying device to perform receiving via the network interface, from a image processing device which is connected with the network, selected data format instruction information identifying a selected data format. The selected data format may be a data format selected as the data format in uploading upload data transmitted from the image processing device to a server device which is: configured to store uploaded data; and connected with the network. The instructions may cause the relaying device to perform executing a conversion processing in a case that the upload data transmitted from the image processing device is data in a first format which can be generated by the image processing device and the data format identified by the selected data format instruction information is a second format which cannot be generated by the image processing device, or in a case that the upload data transmitted from the image processing device is data in a third format which cannot be interpreted by the image processing device and the data format identified by the selected data format instruction information is not the third format. The conversion processing may include: receiving the upload data transmitted from the image processing device; and converting the received upload data into converted data in the data format identified by the selected data format instruction information. The instructions may cause the relaying device to perform transmitting the converted data to the server device via the network interface.

EMBODIMENT (System Configuration)

Figure 1:
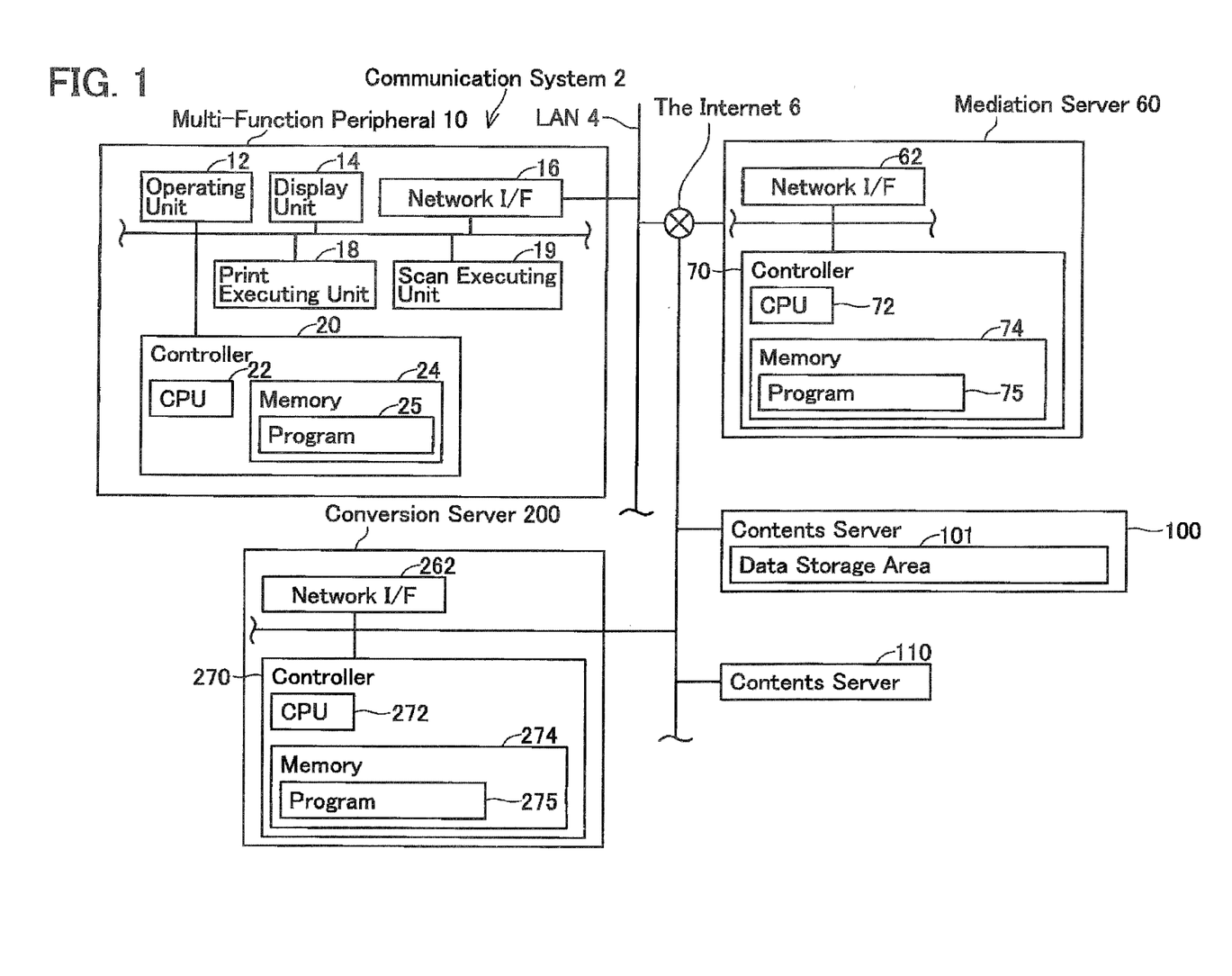
FIG. 1 shows the configuration of a communication system.

As shown in FIG.1, a communication system 2 includes a multi-function peripheral 10, a mediation server 60, contents servers 100 and 110, and a conversion server 200. The multi-function peripheral 10 is connected with a LAN 4. The mediation server 60, the contents servers 100 and 110, and the conversion server 200 are connected with the Internet 6.

(Structure of Multi-Function Peripheral 10)

The multi-function peripheral 10 may execute a Printing function, a Scan function, a Copy function, a FAX function, or the like. The multi-function peripheral 10 comprises an operating unit 12, a display unit 14, a network interface (described as "I/F," hereinafter) 16, a print executing unit 18, a scan executing unit 19, and a controller 20. The operating unit 12 has a plurality of keys. A user can input various instructions to the multi-function peripheral 10 by operating the operating unit 12. The display unit 14 is a display for displaying various pieces of information. The network I/F 16 is connected to the LAN 4. The print executing unit 18 comprises an inkjet or laser printing mechanism. The scan executing unit 19 comprises a scan mechanism such as a CCD or CIS. The controller 20 comprises a CPU 22 and a memory 24. The CPU 22 executes various processes in accordance with program 25 stored in the memory 24.

(Structure of Mediation Server 60)

The mediation server 60 is a server independent of the conversion server 200 and the contents servers 100 and 110. The mediation server 60 is a server for mediating supply of image data from the contents servers 100 and 110 to the multi-function peripheral 10. The mediation server 60 is a server provided by a vendor of the multi-function peripheral 10. The mediation server 60 includes a network I/F 62 and a controller 70. The controller 70 includes a CPU 72 and a memory 74. The CPU 72 performs various processing in accordance with a program 75 stored in the memory 74.

(Structure of the Conversion Server 200)

The conversion server 200 is a server configured as a separate entity from the mediation server 60 and the contents servers 100 and 110. The conversion server 200 executes conversion processing, described below, of data of various types. The conversion server 200 may be a server which is provided to a vendor of the multi-function peripheral 10. The conversion server 200 comprises a network interface 262 and a controller 270. The controller 270 comprises a CPU 272 and memory 274. The memory 274 stores a program 275. The CPU 272 executes various processing according to the program 275.

Some features relating to the description in the present specification are hereby explained. In the present specification, the description "the CPU 72 of the mediation server 60 receives various types of information" includes the technical meaning "the CPU 72 of the mediation server 60 receives various types of information via the network interface 62". Further, the description "the CPU 72 of the mediation server 60 transmits various types of information" includes the technical meaning "the CPU 72 of the mediation server 60 outputs various types of information via the network interface 62". Similar features exist regarding the CPU 272 of the conversion server 200 and the network interface 262. Similar features exist regarding the CPU 22 of the multi-function peripheral 10 and the network interface 16.

In the present specification, a case is explained in which the mediation server 60 and conversion server 200 are connected by the Internet 6 (that is, when a device functioning as the mediation server 60 and a device functioning as the conversion server 200 are disposed at physically distant positions), but other configurations are possible. The mediation server 60 and conversion server 200 may be realized as a single server. In this case, in the single server, a program which functions as the mediation server 60 and a program which functions as the conversion server 200 run, and communication between the programs is performed via a bus in the server. When the mediation server 60 and conversion server 200 are realized as a single server, in the present specification, communication which is explained as communication between the mediation server 60 and the conversion server 200 may be taken to mean communication between the program which functions as the mediation server 60 and the program which functions as the conversion server 200. Further, a configuration may be realized in which a program which functions as the mediation server 60, and moreover also functions as the conversion server 200, runs on a single server. In this case, in the present specification, communication which is explained as communication between the mediation server 60 and the conversion server 200 may replaced with passing of data within the program which functions as the mediation server 60 and which moreover functions as the conversion server 200.

(Structure of Contents Servers 100 and 110)

The contents servers 100 and 110 each are a server used for an online service provided by the vender of the multi-function peripheral 10. The contents servers 100 and 110 are so called storage servers. Note that the contents servers 100 and 110 may be servers used for an online service for lending file storage areas of the respective contents servers 100 and 110 to a user. The online service includes "Evernote (registered trademark of Evernote Corporation)", "Google (registered trademark of Google, Inc.) Docs", "PICASA (registered trademark of Google", Inc.), "FACEBOOK (registered trademark of Facebook, Inc.)", etc. A user of the online service can upload or download various types of data to or from a storage area assigned to the user via the Internet 6.

The contents server 100 comprises a data storage area 101. The data storage area 101 is an area in which various data is stored. Data stored in the data storage area 101 includes data in a first format which can be interpreted by the multi-function peripheral 10, data in a second format which cannot be generated by the multi-function peripheral 10, and data in a third format which cannot be interpreted by the multi-function peripheral 10. An example of the data in the first format is data in an image file format. Specific examples of the data in the image file format include data in the JPEG (abbreviation of Joint Photographic Experts Group) format, data in a bitmap format, and data in the GIF (abbreviation of Graphics Interchange Format) format. An example of the data in the second format and data in the third format is data in a document file format. Specific examples of the data in the document file format include data in a word processing software format, data in a spreadsheet software format, and data in a presentation software format.

(Role of Mediation Server 60)

A business operator providing the contents server discloses a dedicated API (abbreviation of Application Program Interface) for requiring a reply of a folder name of a folder stored in the contents server or a file name of image data stored in the contents server. When the multi-function peripheral supports an API of the contents server, the multi-function peripheral can require a reply of information of the contents server. When specification of the API is changed, it becomes necessary to update software of the multi-function peripheral to support the changed API. However, it is painful for the user to update the software of the multi-function peripheral that is already operating. Accordingly, in the embodiment, the mediation server 60 is provided in order that the multi-function peripheral 10 can upload data to the contents server even when the multi-function peripheral 10 does not support the API of the contents server. That is, the mediation server 60 supports the API for requiring a reply of a folder name of a folder stored in the contents server or a file name of image data stored in the contents server. Furthermore, there is a case in that a plurality of contents servers of different types is connected to the Internet. Furthermore, the business operator providing each contents server discloses a dedicated API (abbreviation of Application Program Interface) to upload data to the contents server. It is necessary for the multi-function peripheral 10 to support APIs of a plurality of contents servers in order to upload data to the respective contents servers, so that it is necessary to store a number of programs. However, storage capacity of a memory of the multi-function peripheral 10 is small as compared with a PC, etc.

Accordingly, in the embodiment, the mediation server 60 is provided so that the multi-function peripheral 10 can upload data to each of the plurality of contents servers without storing a number of programs in the multi-function peripheral 10. That is, the mediation server 60 supports a plurality of APIs for the plurality of respective contents servers. Then, in a state where the multi-function peripheral 10 uploads data to a specific contents server (for example, the contents server 100) among the plurality of contents servers, the mediation server 60 uses an API for the specific contents server to perform various communications to be described below (for example, communication in S31 illustrated in FIG. 2 and communication in S53 and S73 illustrated in FIG. 3) with the specific contents server. Herewith, the multi-function peripheral 10 can upload data to the specific contents server even when the multi-function peripheral 10 does not support the API for the specific contents server.

(Operation of Communication System)

Figure 7:
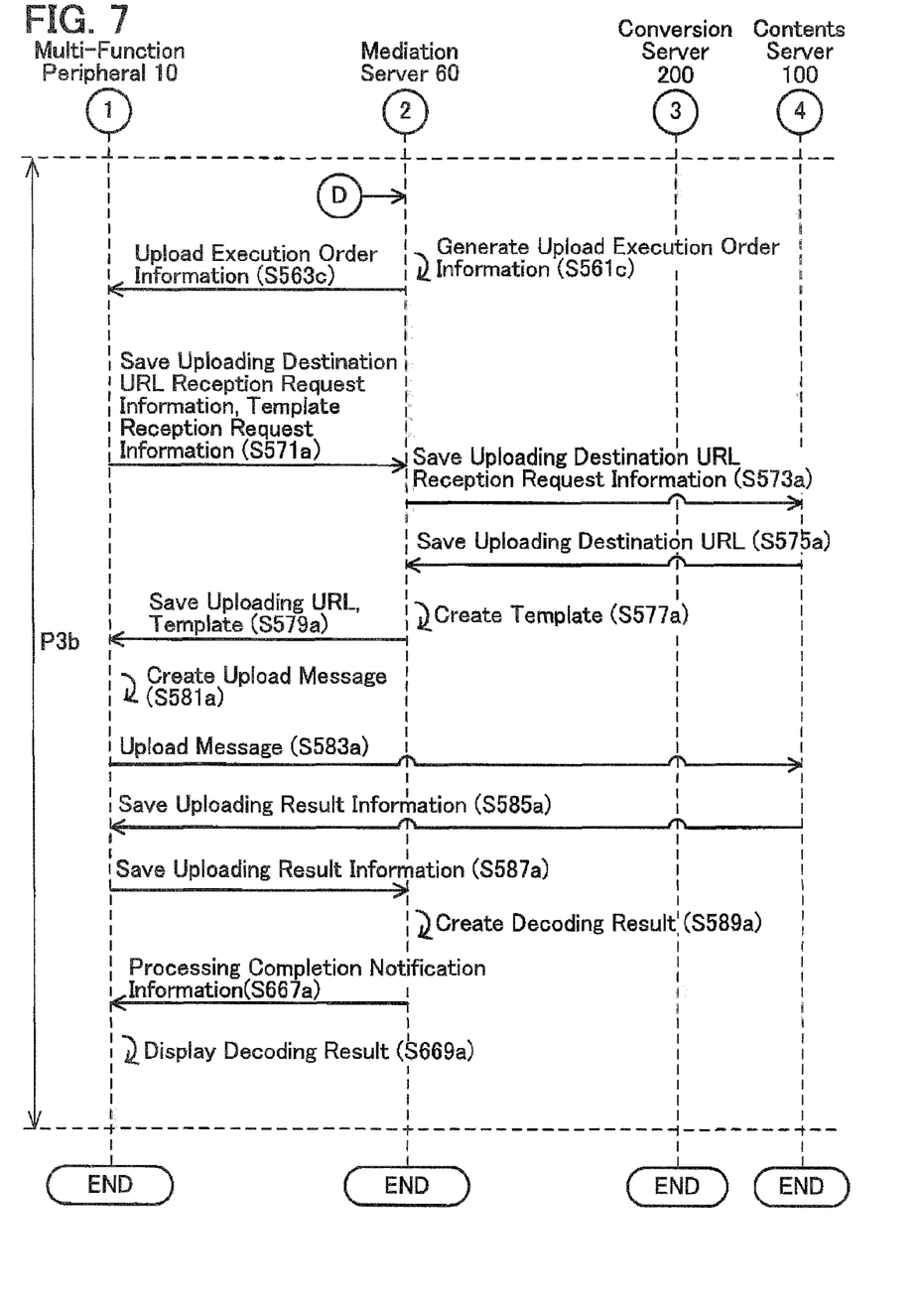
FIG. 7 shows a sequence diagram of various processing executed by each device.
Figure 8:
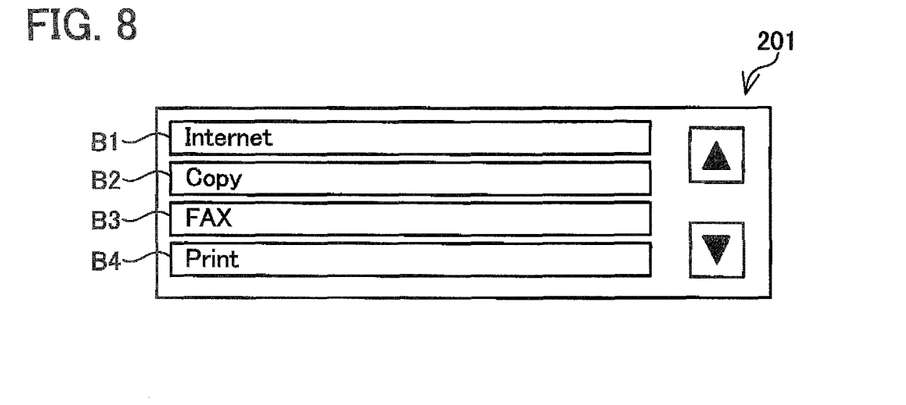
FIG. 8 shows an example of a main screen display.

Operation of the communication system will be described using sequence diagrams of FIGS. 2 to 7. When receiving an order for displaying a main screen, the CPU 22 of the multi-function peripheral 10 cause the display unit 14 to display the main screen in S515. The order for displaying the main screen may be input from the operating unit 12 by a user. Data for displaying the main screen may be preliminarily stored in the memory 24. An example of the main screen 201 is shown in FIG. 8. The main screen 201 includes button images B1 to B4. The button images B1 to B4 are images for receiving an input of an execution order among a plurality of functions. The functions accepted by the button images B1 to B4 are an Internet function, a Copy function, a FAX function, and a Print function, respectively.

In the description example of the present embodiment, a case of uploading various types of data to the contents server 100 will be described. In this case, the button image B1 included in the main screen 201 is selected. In S517, the CPU 22 of the multi-function peripheral 10 transmits button image identification information for identifying the selected button image B1 to the mediation server 60. An example of the button image identification information is "Internet" which is the name of the button image B1.

Figure 2:
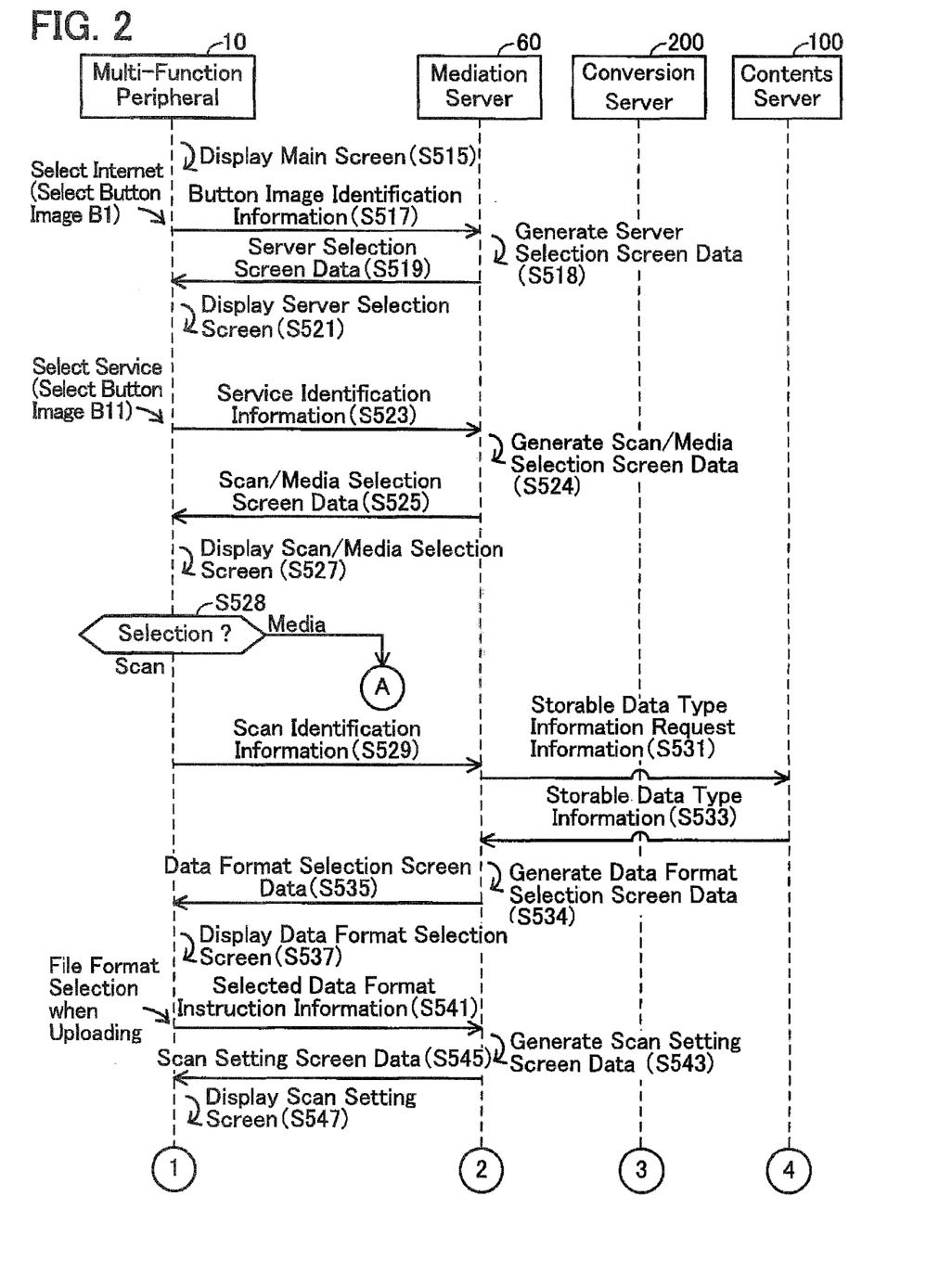
FIG. 2 shows a sequence diagram of various processing executed by each device.

When receiving the button image identification information from the multi-function peripheral 10, the CPU 72 of the mediation server 60 specifies a server selection screen 211 as a screen data that is subsequently to be sent to the multi-function peripheral 10. The server selection screen 211 is a screen for allowing the user to select any one of the contents servers 100 and 110.

In S518, the CPU 72 of the mediation server 60 generates server selection screen data for displaying the server selection screen 211. Information (not illustrated) indicating which information needs to be included in the server selection screen data is stored in the memory 74. The CPU 72 of the mediation server 60 generates the server selection screen data according to this information. The server selection screen data includes information indicating that button images B11 and B12 are to be included in the server selection screen 211, information indicating that a screen for selecting any one of the button images B11 and B12 is to be displayed, information indicating that server names "Server 100" and "Service 110" correspond to the button images B11 and B12, respectively, and information indicating character strings to be displayed in association with the button images B11 and B12. In S519, the CPU 72 of the mediation server 60 transmits the server selection screen data to the multi-function peripheral 10.

Figure 9:
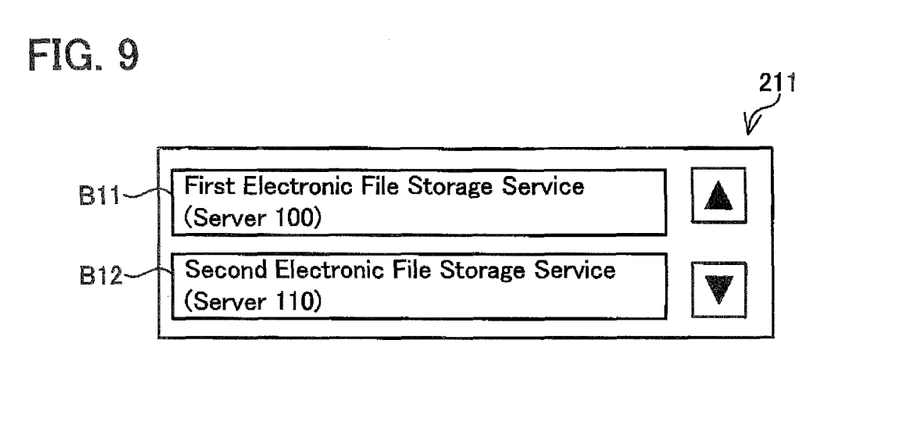
FIG. 9 shows an example of a server selection screen display.

When receiving the server selection screen data from the mediation server 60, the CPU 22 of the multi-function peripheral 10 displays the server selection screen 211 on the display unit 14 in S521. As illustrated in FIG. 9, the server selection screen 211 includes the button images B11 and B12. The button images B11 and B12 are images for accepting selection of the contents servers 100 and 110, respectively. The CPU 22 of the multi-function peripheral 10 creates bitmap information or the like for displaying the images of the button images B11 and B12 based on the server selection screen data received from the mediation server 60 and displays the server selection screen 211 on the display unit 14. In this manner, since the bitmap information is created by the multi-function peripheral 10, bitmap information for displaying the images of the button images B11 and B12 does not need to be included in the server selection screen data. Further, bitmap information for displaying the Up and Down arrow buttons illustrated in FIG. 9 does not need to be included in the server selection screen data. The user operates the operating unit 12 to select a button image that represents the contents server, from which image data is to be downloaded, on the server selection screen 211. In the present embodiment, a case that the user selects the button image B11 (that is, the contents server 100) will be described as an example. Notably, the concept of "selecting a server" may include a concept of "selecting a service". Specifically, selecting the contents server 100 may be equivalent to selecting a service that the contents server 100 provides. Further, in a case that a plurality of servers for providing one service is present, the concept of "selecting a server" may include the concept of selecting at least one of the plurality of servers.

In S523, the CPU 22 of the multi-function peripheral 10 transmits service identification information corresponding to the button image selected by the user to the mediation server. In the example explained in this embodiment, service identification information including the server name "Server 100" is transmitted to the mediation server. In S524, the CPU 72 of the mediation server 60 generates scan/media selection screen data to display a scan/media selection screen based on the service identification information received from the multi-function peripheral 10. The scan/media selection screen is a screen to accept input regarding use of either data generated by scan processing or data saved on media as data for uploading to the contents server. Media is storage media which can be connected to the multi-function peripheral 10. Media can store data in various formats, including data in the above-described first to third formats. An example of media is a memory card, not shown.

In S525, the CPU 72 of the mediation server 60 transmits the scan/media selection screen data to the multi-function peripheral 10. The CPU 22 of the multi-function peripheral 10, when receiving the scan/media selection screen data from the mediation server 60, causes the display unit 14 to display the scan/media selection screen in S527. Details of the scan/media selection screen are similar to the above-described server selection screen 211, and so a detailed explanation is omitted.

In S528, the CPU 22 accepts selection of one among scanning and media. For example, the selection may be regarded as being accepted when the user operates the operating unit 12, and selects the button image indicating the processing to be executed on the scan/media selection screen, the selection is accepted. When scanning is selected (S528: Scan), processing proceeds to S529.

In S529, the CPU 22 of the multi-function peripheral 10 transmits scan identification information indicating that scanning has been selected to the mediation server 60. In S531, the CPU 72 of the mediation server 60 transmits to the contents server 100 storable data type information request information, to request that storable data type information be transmitted to the mediation server 60. Storable data type information is information indicating the types of data formats which can be stored in the contents server 100. One example of storable data type information is an extension indicating a data format. The contents server 100, when receiving storable data type information request information from the mediation server 60, transmits storable data type information to the mediation server 60. In S533, the CPU 72 receives the storable data type information.

In S534, the CPU 72 of the mediation server 60 generates data format selection screen data for display of a data format selection screen 221 based on the storable data type information received in S533. The data format selection screen is a screen to cause the user to select a data format when uploading data to a selected contents server. The data format selection screen may also display a list of data formats which can be stored in the selected contents server, and accept selection by the user of a data format from the list. In the example explained in this embodiment, the data format selection screen data includes information indicating that the button images B21 to B25 are included in the data format selection screen 221, information indicating that a screen is displayed for selection of one of the button images B21 to B25, and information indicating the data format names corresponding to each of the button images B21 to B25. In S535, the CPU 72 transmits the data format selection screen data to the multi-function peripheral 10.

Figure 10:
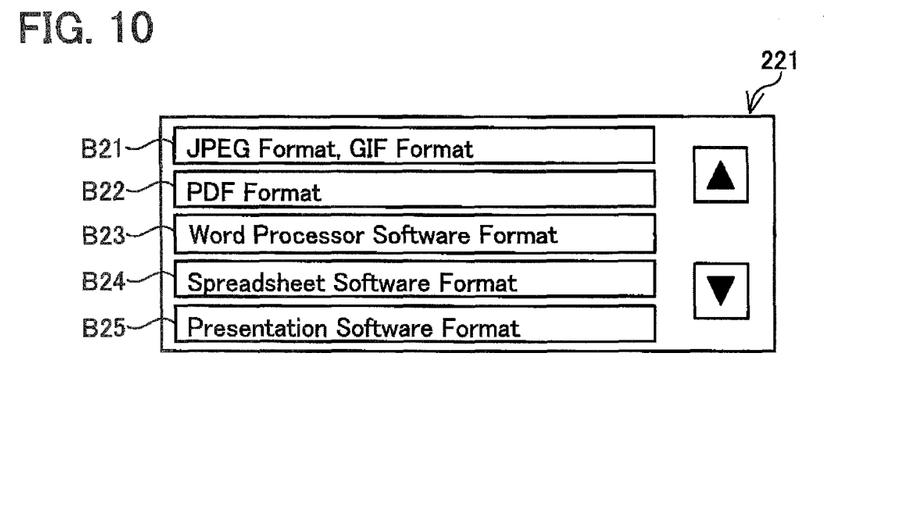
FIG. 10 shows an example of a data selection screen display.

In S537 the CPU 22 of the multi-function peripheral 10, when receiving the data format selection screen data from the mediation server 60, causes the display unit 14 to display the data format selection screen 221. The CPU 22 accepts processing to select the selected data format, which is the data format used in uploading to the contents server 100. As shown in FIG. 10, the data format selection screen 221 includes the button images B21 to B25. Each of the button images B21 to B25 is an image to accept selection of a selected data format. The user operates the operating unit 12 and selects a button image on the data format selection screen 221 that indicates the data format desired for the upload.

In S541, the CPU 22 of the multi-function peripheral 10 transmits selected data format instruction information corresponding to the button image selected by the user to the mediation server 60. Selected data format instruction information is information to identify the selected data format. The selected data format instruction information may be described using a URL (abbreviation of Uniform Resource Locator) description method. In S543, the CPU 72 of the mediation server 60 generates scan setting screen data to display a scan setting screen based on the selected data format instruction information. A scan setting screen is a screen to accept input of various scan settings (for example, the format of data to be generated, resolution, color mode, and similar).

In S545, the CPU 72 of the mediation server 60 transmits the scan setting screen data to the multi-function peripheral 10. In S547 the CPU 22 of the multi-function peripheral 10, when receiving the scan setting screen data from the mediation server 60, causes the display unit 14 to display the scan setting screen. The CPU 22 accepts input of various scan settings by the user via the operating unit 12. One example of various scan settings is the data format of the upload data generated by scanning (for example, JPEG or GIF).

In S551, the CPU 22 of the multi-function peripheral 10 transmits scan setting information to the mediation server 60. Scan setting information may include upload data format instruction information to identify the data format of upload data. An example of upload data format instruction information is an extension.

In S557, the CPU 72 of the mediation server 60 determines whether the conversion processing between the data format which can be generated by the multi-function peripheral 10 and the data format which cannot be generated by the multi-function peripheral 10 must be performed for the upload data. Specifically, when the upload data to be transmitted from the multi-function peripheral 10 is data in a first format which can be generated by the multi-function peripheral 10, and moreover the data format when the upload data is saved to the contents server 100 is a second format which cannot be generated by the multi-function peripheral 10, then it is determined that conversion processing is necessary. This determination may be performed by comparing the data format identified in the upload data format instruction information included in the scan setting information received in S551 with the data format identified in the selected data format instruction information received in S541. For example, when the upload data is in the JPEG format or PDF format, and the data format when saving the upload data to the contents server 100 is a word processor software format, it is determined that conversion processing is necessary. When it is determined that conversion processing is necessary (S557: YES), processing proceeds to S561, and the conversion processing order processing P1, wait command processing P2, and first upload processing P3 are executed.

Figure 3:
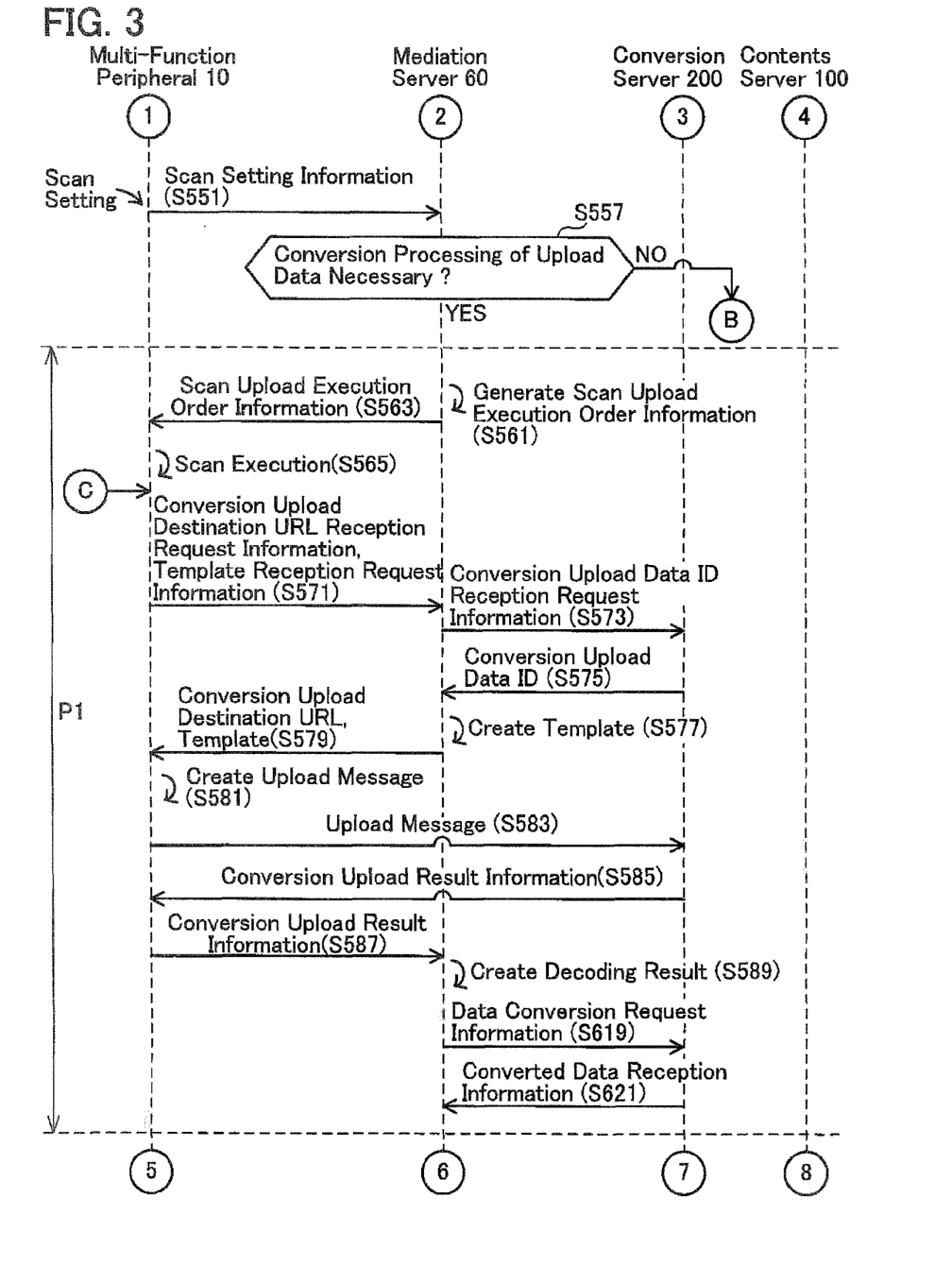
FIG. 3 shows a sequence diagram of various processing executed by each device.

The conversion processing order processing P1 (S561 to S621) is processing to upload the upload data from the multi-function peripheral 10 to the conversion server 200. In this processing, an execution order is then given for conversion processing of the upload data which has been uploaded to the conversion server 200. The conversion processing is processing to convert the upload data into converted data in the data format identified by the selected data format instruction information. Processing to upload the upload data to the conversion server 200 for conversion processing may also be called "conversion uploading". Further, processing to upload the upload data and the converted data to save the same to the contents server may be called "save uploading". A specific example of the conversion processing is processing to convert data in the word processor software format into data in the JPEG format.

Details of the conversion processing order processing P1 are explained below. In S561, the CPU 72 of the mediation server 60 generates scan upload execution order information. Scan upload execution order information is information to order the multi-function peripheral 10 to upload the upload data generated by the scan processing. In S563, the CPU 72 transmits the scan upload execution order information to the multi-function peripheral 10. In S565, the CPU 22 of the multi-function peripheral 10 executes scanning of an image. Specifically, the user sets a sheet on which a prescribed image has been recorded on the scan executing unit 19, and presses a button to start reception on the operating unit 12, then the CPU 22 causes the scan executing unit 19 to scan the image recorded on the sheet, and creates upload data from the scanned image data. The scan executing unit 19 scans the image based on the scan settings input in S547.

In S571, the CPU 22 transmits conversion upload destination URL reception request information and template reception request information to the mediation server 60. Conversion upload destination URL reception request information is information to request a conversion upload destination URL, which is information necessary to perform uploading to the conversion server 200. Template reception request information is information to request a template for an upload message, described below. In S573, the CPU 72 of the mediation server 60 transmits conversion upload data ID reception request information to the conversion server 200. Conversion upload data ID reception request information is information to request a conversion upload data ID to the conversion server 200. The conversion upload data ID is a data ID for identifying upload data uploaded to the conversion server 200. In S575, the CPU 272 of the conversion server 200 transmits the conversion upload data ID to the mediation server 60.

In S577, the CPU 72 creates a template for an upload message. A template for an upload message is a template for a message when uploading upload data to the conversion server 200.

In S579, the CPU 72 transmits the conversion upload destination URL and the template for the upload message to the multi-function peripheral 10. An example of the conversion upload destination URL is the URL of the conversion server 200.

In S581, the CPU 22 creates the upload message based on the received template, the received conversion upload destination URL, and the upload data created in S565. Specifically, the multi-function peripheral 10 stores binary data as the upload data, the conversion upload destination URL, the data size of the upload data, and various other information at prescribed positions in the template received from the mediation server 60. Due to this, an upload message suitable for the conversion server 200 can be created.

In S583, the CPU 22 transmits the upload message to the conversion server 200. In S585, the CPU 272 of the conversion server 200 transmits conversion upload result information to the multi-function peripheral 10. Conversion upload result information is information indicating whether the upload data was normally uploaded to the conversion server 200. In S587, the CPU 22 of the multi-function peripheral 10 transmits the conversion upload result information to the mediation server 60.

In S589, the CPU 72 of the mediation server 60 decodes the conversion upload result information and creates a decoding result. Conversion upload result information is information transmitted from the conversion server 200 to the multi-function peripheral 10, and thus has specifications particular to the conversion server 200. Hence by using a decoding program, not shown, included in the program 75 stored in the mediation server 60, the conversion upload result information can be decoded. A decoding result is a message in a format interpretable by the multi-function peripheral 10. The decoding result includes the conversion upload result included in the decoded conversion upload result information.

In S619, the CPU 72 transmits data conversion request information to the conversion server 200. Data conversion request information is information to request execution of conversion processing of upload data identified by the conversion upload data ID received in S575 (that is, the upload data uploaded to the conversion server 200 in S583). In S621, the CPU 272 of the conversion server 200 transmits converted data reception information to the mediation server 60. Converted data reception information may include a conversion job ID. The conversion job ID is information to identify conversion processing performed according to the processing to request execution of conversion processing (S619).

Figure 4:
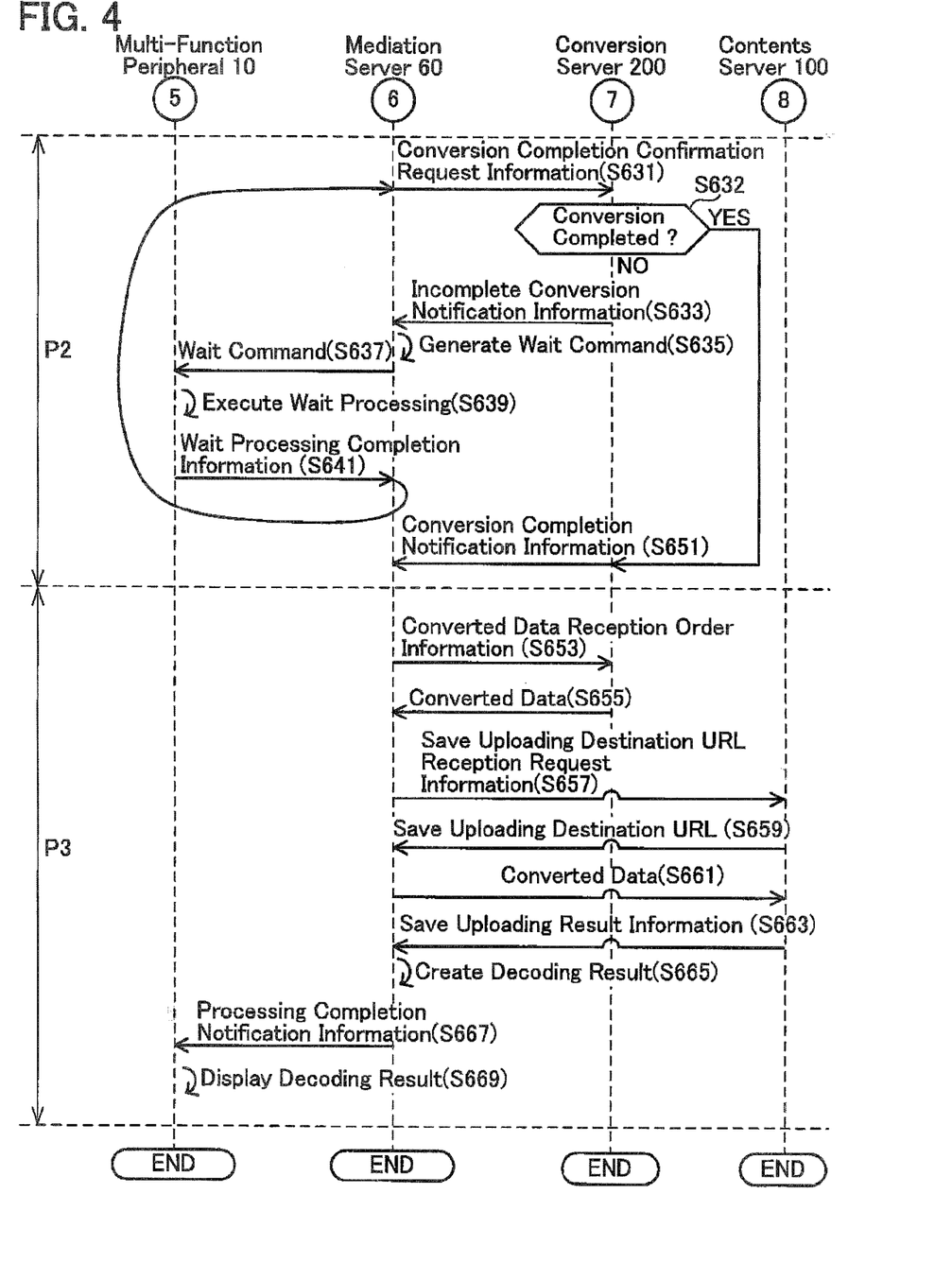
FIG. 4 shows a sequence diagram of various processing executed by each device.

Wait command processing P2 (S631 to S651) is processing to cause the multi-function peripheral 10 to wait until the completion of conversion processing, once the conversion processing has been started for the upload data. The conversion server 200 executes the conversion processing of the upload data in response to the reception of the data conversion request information in S619. The conversion processing may be performed for the upload data divided into prescribed data amounts (for example, 100 kB).

In S631, the CPU 72 of the mediation server 60 transmits conversion completion confirmation request information to the conversion server 200. The conversion completion confirmation request information is information requesting confirmation by the conversion server 200 as to whether the conversion processing requested of the conversion server 200 in S619 has been completed.

In S632, the CPU 272 of the conversion server 200 determines whether the conversion processing has completed. Specifically, using the converted data reception information included in the conversion completion confirmation request information, one conversion processing item for determination as to whether the conversion processing has completed is specified. Then, it is determined whether the conversion of a prescribed amount of data (for example, 100 kB) in the leading portion of the upload data to be converted in the specified conversion processing has completed. In a case that the conversion processing has not completed (S632: NO), processing proceeds to S633.

In S633, the CPU 272 transmits to the mediation server 60 incomplete conversion notification information indicating that conversion processing has not completed. In S635, the CPU 72 of the mediation server 60 generates a wait command in response to the reception of the incomplete conversion notification information.

The wait command is an order to cause the multi-function peripheral 10 to wait for the completion of the conversion processing.

In S637, the CPU 72 transmits the wait command to the multi-function peripheral 10. In S639, the CPU 22 of the multi-function peripheral 10 executes wait processing to wait for the completion of the conversion processing. The wait processing may for example be processing in which a timer which had been started to detect a timeout of the conversion processing is reset and again started. Or, for example, the wait processing may be processing in which, by increasing the timeout time stored in memory 24 such that the time until timeout of conversion processing is extended, whereby the time until timeout of conversion processing is lengthened. The reason for executing the wait processing will be explained. In a case that the period from input of scan settings (S551) until reception of processing completion notification information (S667) exceeds the timeout time, a timeout error occurs. In such a case, a communication error may occur in the network interface 16 of the multi-function peripheral 10, and the reception of the processing completion notification information may be failed. Hence by performing the wait processing, the occurrence of the timeout error is prevented.

In S641, the CPU 22 transmits to the mediation server 60 the wait processing completion information indicating that wait processing execution has completed. Then processing returns to S631.

However, in a case that in S632 it is determined that the conversion processing has completed (S632: YES), the processing proceeds to S651. In S651, the CPU 272 of the conversion server 200 transmits to the mediation server 60 the conversion completion notification information indicating that the conversion processing of a prescribed data amount in the leading portion of the upload data has completed.

The first upload processing P3 is explained. The first upload processing P3 (S653 to S669) is processing to upload and save the converted data from the mediation server 60 to the contents server 100. In S653, the CPU 72 of the mediation server 60 transmits converted data reception order information to the conversion server 200. Converted data reception order information is an order to cause the conversion server 200 to transmit the converted data, identified by the converted data reception information, to the mediation server 60.

In S655, the CPU 272 of the conversion server 200 transmits the converted data, specified by the converted data reception order information, to the mediation server 60. In the conversion server 200, when performing the conversion processing of the upload data for a prescribed amount of data at a time (for example, 100 kB), in S655 the converted data may be transmitted in units of the prescribed amount of data at a time to the mediation server 60.

In S657, the CPU 72 of the mediation server 60 transmits save uploading destination URL reception request information to the contents server 100. Save uploading destination URL reception request information is information to request a save uploading destination URL, which is information necessary to perform uploading to the contents server 100. In S659, the CPU 72 receives a save uploading destination URL transmitted from the contents server 100. In S661, the CPU 72 of the mediation server 60 transmits converted data to the contents server 100. In S663, the CPU 72 receives save uploading result information transmitted from the contents server 100. Save uploading result information is information indicating whether the converted data has been stored normally on the contents server 100.

In S665, the CPU 72 decodes the save uploading result information and creates a decoding result. For example, when the data size of the uploaded converted data exceeds the data size which can be stored in the contents server 100, a decoding result is created indicating that saving was not possible because the capacity was exceeded.

In S667, the CPU 72 of the mediation server 60 transmits processing completion notification information to the multi-function peripheral 10. Processing completion notification information includes data to cause the display unit 14 of the multi-function peripheral 10 to display the decoding result. In S669, the CPU 22 of the multi-function peripheral 10 causes the display unit 14 to display the decoding result based on the processing completion notification information. Then, the flow of processing is ended.

On the other hand, when in S557 it is determined that conversion processing of upload data is not necessary (S557: NO), it is determined that the upload data will be uploaded to the contents server 100 without conversion. Hence processing proceeds to S561a in FIG. 5, and second upload processing P3a is executed.

Figure 5:
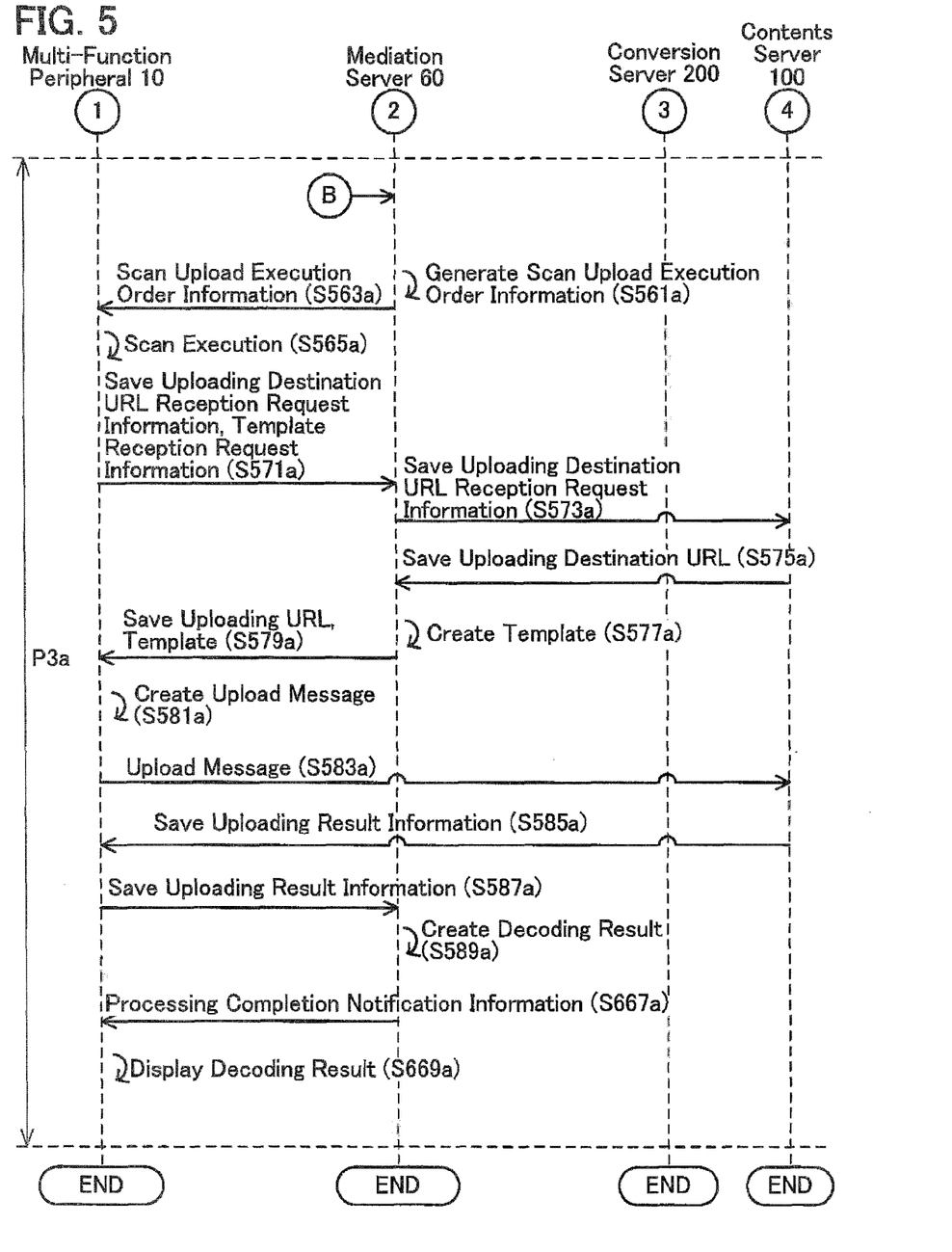
FIG. 5 shows a sequence diagram of various processing executed by each device.

FIG. 5 is used to explain the second upload processing P3a. The second upload processing P3a (S561a to S669a) is processing to upload and save upload data from the multi-function peripheral 10 to the contents server 100.

In S561a, the CPU 72 of the mediation server 60 generates the scan upload execution order information. In S563a, the CPU 72 transmits the scan upload execution order information to the multi-function peripheral 10. In S565a, the CPU 22 of the multi-function peripheral 10 executes the image scanning and creates the upload data. In S571a, the CPU 22 transmits the save uploading destination URL reception request information and the template reception request information to the mediation server 60.

In S573a, the CPU 72 of the mediation server 60 transmits the save uploading destination URL reception request information to the contents server 100. In S575a, the CPU 72 receives the save uploading destination URL transmitted from the contents server 100. In S577a, the CPU 72 creates the template for an upload message. In S579a, the CPU 72 transmits the save uploading destination URL and the template for an upload message to the multi-function peripheral 10. In S581a, the CPU 22 creates the upload message. In S583a, the CPU 22 transmits the upload message to the contents server 100. In S585a, the CPU 22 receives the save uploading result information transmitted from the contents server 100.

In S587a, the CPU 22 of the multi-function peripheral 10 transmits the save uploading result information to the mediation server 60. In S589a, the CPU 72 of the mediation server 60 decodes the save uploading result information and creates a decoding result. In S667a, the CPU 72 transmits the processing completion notification information to the multi-function peripheral 10. In S669a, the CPU 22 of the multi-function peripheral 10 causes the display unit 14 to display the decoding result based on the processing completion notification information. Then, the flow of processing is ended.

Figure 6:
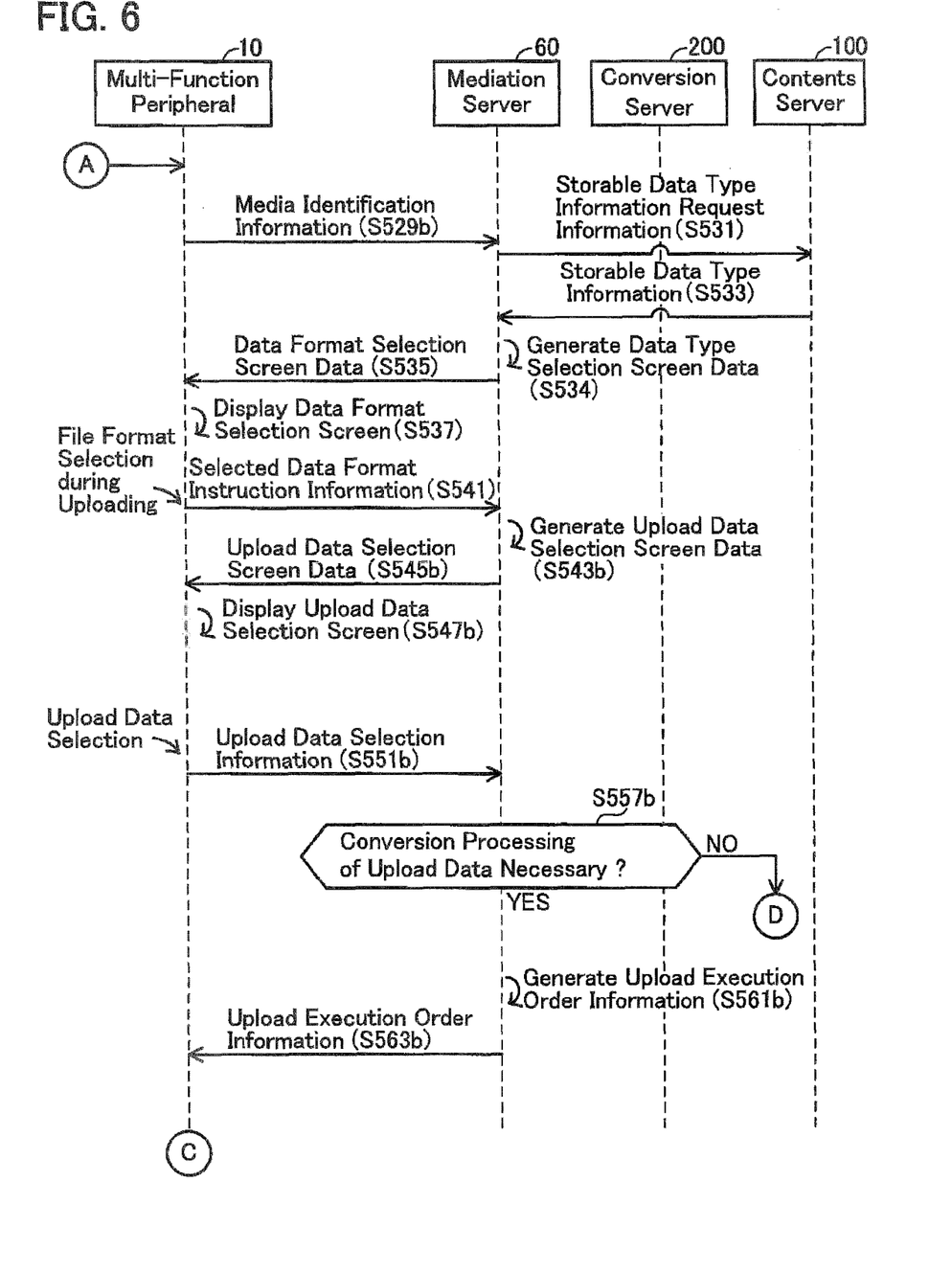
FIG. 6 shows a sequence diagram of various processing executed by each device.

On the other hand, in S528 in FIG. 2, when media is selected (S528: media), processing proceeds to S529b (FIG. 6). In S529b, the CPU 22 of the multi-function peripheral 10 transmits media identification information indicating that media has been selected to the mediation server 60. The processing from S531 to S541 in FIG. 6 is similar to the processing from S531 to S541 in FIG. 2, and so an explanation is omitted.

In S543b, the CPU 72 of the mediation server 60 generates upload data selection screen data to display the upload data selection screen. An upload data selection screen is a screen to accept operations to select upload data from various data stored in media. In S545b, the CPU 72 transmits the upload data selection screen data to the multi-function peripheral 10. In S547b, the CPU 22 of the multi-function peripheral 10, in receiving the upload data selection screen data from the mediation server 60, causes the display unit 14 to display the upload data selection screen. The CPU 22 accepts an upload data selection by the user via the operating unit 12.

When an upload data selection is accepted, in S551b the CPU 22 transmits the upload data selection information to the mediation server 60. Upload data selection information may include upload data format instruction information to identify the data format of the upload data.

In S557b, the CPU 72 of the mediation server 60 determines whether the conversion processing of the upload data must be performed. Specifically, when the upload data transmitted from the multi-function peripheral 10 is data in a third format which cannot be interpreted by the multi-function peripheral 10, and in addition the data format when saving the upload data to the contents server 100 is not the third format, then it is determined that conversion processing is necessary. This determination may be made by comparing the data format identified using upload data format instruction information included in the upload data selection information received in S551b with the data format identified using selected data format instruction information received in S541. For example, when the upload data is in the word processor software format, and the data format when saving the upload data to the contents server 100 is the JPEG format or a presentation software format, it is determined that conversion processing is necessary.

In a case that it is determined that conversion processing is necessary (S557b: YES), processing proceeds to S561b. In S561b, the CPU 72 of the mediation server 60 generates upload execution order information. Upload execution order information is information to order the multi-function peripheral 10 to upload the upload data read out from the media. In S563b, the CPU 72 transmits the upload execution order information to the multi-function peripheral 10. Then, processing proceeds to S571 in FIG. 3. The subsequent processing is as described above, and so an explanation is omitted.

On the other hand, in a case in S557b where it is determined that conversion processing is not necessary (S557b: NO), then it is determined that the upload data read out from the media is to be uploaded to the contents server 100 without conversion. Hence processing proceeds to S561c in FIG. 7, and third upload processing P3b is executed. In S561c, the CPU 72 of the mediation server 60 generates upload execution order information. In S563c, the CPU 72 transmits the upload execution order information to the multi-function peripheral 10. Thereafter, the processing from S571a to S669a in FIG. 7 is similar to the processing from S571a to S669a in FIG. 5, and so an explanation is omitted.

(Advantageous Effect)

In the mediation server 60 described in the present specification, when the upload data transmitted from the multi-function peripheral 10 is data in the first format (that is, data which can be generated by the multi-function peripheral 10), and the data format when storing the upload data on the contents server 100 is data in the second format (that is, data which cannot be generated by the multi-function peripheral 10) (S557: YES), then upload data can be converted into the converted data which is data in the second format by the conversion server 200 (S561 to S651), and the converted data can be stored in the contents server (S661). Further, when upload data transmitted from the multi-function peripheral 10 is data in the third format (that is, data which cannot be interpreted by the multi-function peripheral 10), and the data format when saving the upload data on the contents server 100 is not the third format (S557b: YES), the upload data can be converted into converted data in a data format other than the third format by the conversion server 200 (S561b to S651), and the converted data can be stored in the contents server (S661). Due to this, upload data generated by the multi-function peripheral 10 can be stored in the contents server 100 in a type of data format which cannot be generated by the multi-function peripheral 10.

In a mediation server 60 described in the present specification, when the data format of upload data and the data format used in uploading to the contents server are the same (S557: NO), the multi-function peripheral 10 can be made to execute processing for uploading of the upload data to a contents server (S583a). Hence conversion processing (S561 to S651) can be omitted.

In a mediation server 60 described in the present specification, the save uploading destination URL, which is information to transmit the converted data to the contents server, can be received from the contents server (S659), and the converted data can be transmitted to the contents server (S661). Due to this, converted data can be stored in the contents server.

In a mediation server 60 described in the present specification, the storable data type information, indicating the types of data formats which can be stored in the contents server, can be received from the contents server (S533). Further, the multi-function peripheral 10 can be made to display the types of data formats which are storable by the contents server (S535). Due to this, the upload data can be stored in the contents server in the data format in which the contents server can store data.

In the mediation server 60 described in the present specification, the wait command to cause the multi-function peripheral 10 to wait for the completion of the conversion processing during execution of the conversion processing can be transmitted to the multi-function peripheral 10 (S637). Further, in response to the completion of the conversion processing (S632: YES), the converted data can be transmitted to the contents server (S661). Hence the situation in which the timeout or other error occurs in the multi-function peripheral 10 can be prevented.

In a mediation server 60 described in the present specification, the save uploading result information transmitted from the contents server can be received (S663), whether the processing to store converted data on the contents server has been successful can be decoded (S665), and the multi-function peripheral 10 can be made to display the decoding result (S669). Due to this, the user can confirm whether converted data could be stored in the contents server 100.

In the communication system 2 described in the present specification, information such as the selected data format instruction information (S541) can be described using the URL description method. The URL description method is a widely known method, and thus when communicating the above information between the mediation server, the conversion server, contents server, and other devices, the method can be used without dependence on models.

The communication system 2 described in the present application comprises the mediation server 60 and the conversion server 200. The mediation server 60, conversion server 200, and contents servers 100 and 110 are interconnected through the Internet 6. Various kinds of data, such as contents data and converted data reception information, are communicated between the mediation server 60 and the conversion server 200. According to this, even when the mediation server 60 and the conversion server 200 are separate servers, and are interconnected via a communication path, the contents server can be made to store converted data.

While specific embodiments of the present invention have been described in detail above, such description is for illustrative purposes only and is not intended to limit the scope and claims of the invention. Techniques described in the claims of the invention include various modifications and changes made to the specific examples illustrated above. Modifications according to the above embodiments are listed below.

(MODIFIED EXAMPLE)

Processing to determine whether the conversion processing must be performed, as indicated in S557 and S557b, on the upload data need not necessarily be performed by the mediation server 60. For example, the processing may be performed by the multi-function peripheral 10. In this case, the CPU 22 of the multi-function peripheral 10 may determine whether conversion processing is necessary based on the selected data format accepted in S537 (that is, the data format when uploading to the contents server 100) and the data format of the upload data accepted in S547, and transmit the information indicating the determination result to the mediation server 60.

In S661, various configurations may be used for uploading converted data to the contents server 100. For example, the conversion server 200 may upload converted data to the contents server 100. In this case, in S653 the CPU 72 of the mediation server 60 may transmit, to the conversion server 200, upload request information to upload converted data to the contents server 100. Then, the CPU 272 of the conversion server 200 may transmit the converted data to the contents server 100, and receive save uploading result information from the contents server 100. The CPU 272 may transmit the received save uploading result information to the mediation server 60.

Further, converted data generated by the conversion server 200 may be uploaded to the contents server 100 via the multi-function peripheral 10. In this case, the subject performing the processing of S653 to S661 may be the multi-function peripheral 10 rather than the mediation server 60.

In S547b, data which can be selected on the upload data selection screen may be limited to data formats determined in advance. For example, when there is the constraint that only data in the JPEG format can be selected as upload data, then only file names of data in the JPEG format may be displayed on the upload data selection screen.

Various methods may be used to cause the multi-function peripheral 10 to execute wait processing (S639) to wait for completion of conversion processing. For example, the multi-function peripheral 10 may execute wait processing in receiving incomplete conversion notification information indicating that conversion processing has not been completed. The multi-function peripheral 10 may receive incomplete conversion notification information from the conversion server 200.

S571 is not limited to a configuration in which the conversion upload destination URL is requested to the mediation server 60. When the server to be accessed to execute conversion processing is fixed as the conversion server 200, an URL to access the conversion server 200 may be stored in advance in memory 24 of the multi-function peripheral 10. In this case, in S571 the URL to access the conversion server 200 may be read out from memory 24.

In S515, various configurations may be used to cause the display unit 14 to display the main screen. For example, when an order to display the main screen is input by the user to the operating unit 12, the multi-function peripheral 10 may access the mediation server 60. The mediation server 60 may create main screen data to cause display of the main screen, and may transmit the data to the multi-function peripheral 10. The multi-function peripheral 10 may display the main screen based on the main screen data.

In the present embodiment, a case was explained in which contents servers 100 and 110 are connected to the Internet 6; but three or more contents servers may be connected to the Internet 6.

In the embodiment, the case is described in which the CPUs 22, 72 and 272 of the multi-function peripheral 10, the mediation server 60 and the conversion server 200 execute processing according to software, but is not limited thereto. At least a part of functions provided according to the software may be provided by hardware such as a logic circuit.

A concept that includes the mediation server 60 and the conversion server 200 may be referred to as a "relaying device". That is, the "relaying device" as claimed may include the configuration including the mediation server 60 and the conversion server 200 as described in the specification.

The invention claimed is:

1. A relaying device comprising:
   a network interface configured to connect with a network;
   a processor coupled to the network interface; and
   a memory storing instructions, the instructions, when executed by the processor, causing the relaying device to perform:
   receiving, via the network interface, from an image processing device which is connected with the network, selected data format instruction information identifying a selected data format, the selected data format being a data format selected as the data format in uploading upload data transmitted from the image processing device to a server device which is: configured to store uploaded data; and connected with the network;
   receiving, via the network interface, from the image processing device, upload data format instruction information identifying a data format of the upload data; and
   determining whether the data format of the upload data, identified by the upload data format instruction information, is a first format, a second format, a third format, or another format and whether the selected data format, identified by the selected data format instruction information, is the first format, the second format, the third format or another format, the first format being a format which can be generated by the image processing device, the second format being a format which cannot be generated by the image processing device, and the third format being a format which cannot be interpreted by the image processing device,
   when it is determined that the upload data is in the first format and the selected data format is the second format or that the upload data is in the third format and the selected data format is not the third format, the instructions further cause the relaying device to perform:
   receiving the upload data transmitted from the image processing device;
   converting the received upload data into converted data in the selected data format; and
   transmitting the converted data to the server device via the network interface,
   when it is determined that the data format of the upload data and the selected data format are the same, the instructions further cause the relaying device to perform:
   transmitting, via the network interface upload information to the image processing device, the upload information being for causing the image processing device to transmit the upload data to the server device not via the relaying device.

2. The relaying device according to claim 1, wherein the converted data is transmitted to the server device, via the network interface, in response to an reception of information which is transmitted from the server device and which is information used for transmitting the converted data to the server device.

3. The relaying device according to claim 1, wherein the upload information includes transmitting transmission information, and the upload information is transmitted in response to an reception of output information,
   the transmission information being for causing the image processing device to transmit the upload data to the server device, and
   the output information being used for transmitting the upload data to the server device and being transmitted from the server device.

4. The relaying device according to claim 1, wherein the instructions further causes the relaying device to perform:
   receiving storable data type information transmitted from the server device and indicating a storable data type which is a type of data that can be stored in the server device;
   generating first display information based on the storable data type information, the first display information being used to cause a display unit of the image processing device to display the storable data type; and
   transmitting the generated first display information to the image processing device via the network interface.

5. The relaying device according to claim 1, wherein the instructions further cause the relaying device to perform:
   transmitting a wait command to the image processing device, the wait command instructing to wait for completion of the converting, and
   the transmitting includes transmitting the converted data to the server device via the network interface in response to the completion of the converting.

6. The relaying device according to claim 1, wherein the instructions further causes the relaying device to perform:
   receiving upload result information transmitted from the server device via the network interface, the upload result information indicating whether a storage processing to store in the server device the converted data transmitted to the server device has been successful;

determining whether the storage processing has been successful based on the received upload result information; and transmitting second display information to the image processing device via the network interface, the second display information causing a display unit of the image processing device to display the determination result.

7. The relaying device according to claim 1, wherein
the data in the second format and the data in the third format are data in a document file format, and
the data in the first format is data in an image file format.

8. The relaying device according to claim 1, wherein
the selected data format instruction information is described according to a Uniform Resource Locator (URL) description method.

9. The relaying device according to claim 1, further comprising:
a mediation server comprising a mediation server network interface configured to connect with the network; and
a conversion server comprising a conversion server network interface configured to connect with the network, wherein:
the conversion server is configured to perform:
receiving the upload data transmitted from the image processing device via the conversion server network interface; and
converting the received upload data; and
the mediation server is configured to:
receiving, via the mediation server network interface, the converted data generated by the converting and transmitted from the conversion server; and
transmitting the received converted data to the server device via the mediation server network interface.

10. The relaying device according to claim 9, wherein
the mediation server is further configured to perform transmitting a wait command to the image processing device, since when a command to execute the converting was transmitted to the conversion server until when completion information transmitted from the conversion server and indicating that the converting has been completed is received.

11. An image processing device comprising:
a network interface configured to connect with a network; and
a control device coupled to the network interface and configured to perform:
selecting a selected data format, the selected data format being a data format selected as the data format in uploading upload data transmitted from the image processing device to a server device which is: configured to store uploaded data; and connected with the network;
transmitting, via the network interface, to a relaying device which is connected with the network, selected data format instruction information identifying the selected data format;
transmitting, via the network interface, to the relaying device, upload data format instruction information identifying a data format of the upload data; and
transmitting, via the network interface, to the relaying device, determination request information for causing the relaying device to determine whether the data format of the upload data, identified by the upload data format instruction information, is a first format, a second format, a third format, or another format and whether the selected data format, identified by the selected data format instruction information, is the first format, the second format, the third format or another format, the first format being a format which can be generated by the image processing device, the second format being a format which cannot be generated by the image processing device, and the third format being a format which cannot be interpreted by the image processing device;

when it is determined that the upload data is in the first format and the selected data format is the second format or that the upload data is in the third format and the selected data format is not the third format, the control device is further configured to perform:
receiving, via the network interface, from the relaying device, first instruction information for causing the image processing device to transmit execute request information to the relaying device, execution request information for causing the relaying device to execute a conversion processing including: receiving the upload data transmitted from the image processing device; converting the received upload data into converted data in the data format identified by the selected data format instruction information; and transmitting the converted data to the server device,
transmitting, via the network interface, to the relaying device, the execution request information and the upload data, when it is determined that the data format of the upload data and the selected data format are the same, the control device is further configured to perform:
receiving, via the network interface, from the relaying device, upload information for causing the image processing device to transmit the upload data to the server device not via the relaying device; and
transmitting, via the network interface, the upload data to the server device not via the relaying device.

12. A system comprising an image processing device and a relaying device,
the image processing device comprising:
a first network interface configured to connect with a network; and
a control device coupled to the first network interface,
the relaying device comprising:
a second network interface configured to connect with the network;
a processor coupled to the second network interface; and
a memory storing instructions,
wherein
the control device of the image processing device is configured to perform:
selecting a selected data format, the selected data format being a data format selected as the data format in uploading upload data transmitted from the image processing device to a server device which is: configured to store uploaded data; and connected with the network;
transmitting, to the relaying device, via the first network interface, selected data format instruction information identifying the selected data format; and
transmitting, via the first network interface, to the relaying device, upload data format instruction information identifying a data format of the upload data,
the instructions, when executed by the processor of the relaying device, cause the relaying device to perform:

receiving, from the image processing device, via the second network interface, the selected data format instruction information and the upload data format instruction information; and determining whether the data format of the upload data, identified by the upload data format instruction information, is a first format, a second format, a third format, or another format and whether the selected data format, identified by the selected data format instruction information, is the first format, the second format, the third format or another format, the first format being a format which can be generated by the image processing device, the second format being a format which cannot be generated by the image processing device, and the third format being a format which cannot be interpreted by the image processing device, when it is determined that the upload data is in the first format and the selected data format is the second format or that the upload data is in the third format and the selected data format is not the third format, the instructions further cause the relaying device to perform:

transmitting first information, via the second network interface, to the image processing device, the first information being for causing the image processing device to transmit the upload data to the relaying device;

receiving, via the second network interface, the upload data transmitted from the image processing device;

converting the received upload data into converted data in the selected data format; and transmitting, via the second network interface, the converted data to the server device, when it is determined that the data format of the upload data and the selected data format are the same, the instructions further cause the relaying device to perform:

transmitting upload information, via the second network interface, to the image processing device, the upload information being for causing the image processing device to transmit the upload data to the server device not via the relaying device, and the control device of the image processing device is further configured to perform:

transmitting the upload data, via the first network interface, to the relaying device, when the first information is received; and transmitting the upload data, via the first network interface, to the server device not via the relaying device, when the upload information is received.

\* \* \* \* \*